(12) United States Patent
Maeda

(10) Patent No.: US 12,093,584 B2
(45) Date of Patent: Sep. 17, 2024

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Masao Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/327,770

(22) Filed: Jun. 1, 2023

(65) Prior Publication Data

US 2023/0401022 A1     Dec. 14, 2023

(30) Foreign Application Priority Data

Jun. 8, 2022   (JP) .................................. 2022-093325

(51) Int. Cl.
*H04N 1/00*     (2006.01)
*G06F 3/12*     (2006.01)

(52) U.S. Cl.
CPC .......... *G06F 3/1238* (2013.01); *G06F 3/1222* (2013.01); *H04N 1/00973* (2013.01)

(58) Field of Classification Search
CPC ............. H04N 1/00973; H04N 1/4413; H04N 1/4433; G06F 3/1238; G06F 3/1222; G06F 21/10; G06F 21/629; G06F 11/3013; G06F 11/302; G06F 11/3062; G06F 11/32; G06F 11/321; G06F 11/3409; G06F 11/3423; G06F 11/3438; G06F 21/6218; G06F 21/64; G06F 2201/81; G06F 2201/86; G06F 2201/865; G06F 2221/2137; G06F 3/048; G06F 3/04812; G06F 3/04817; G06F 9/541; G06F 21/84; G06F 15/00; G06F 3/1239; G06F 3/167; G06F 21/6245; G06F 21/6281; G06F 21/71; G06F 9/445; G06F 11/3656; G06F 21/51; G06F 21/53; G06F 21/60; G06F 21/62; G06F 21/6209; G06F 21/6227; G06F 2221/2101; G06F 9/452; G06F 12/14; G06F 16/252; G06F 16/951; G06F 16/9535; G06F 16/972; G06F 18/241; G06F 21/31; G06F 21/35; G06F 21/575; G06F 21/577; G06F 21/74; G06F 2221/2141; G06F 2221/2147; G06F 2221/2151; G06F 3/1203; G06F 3/1454; G06F 3/147; G06F 40/174; G06F 9/451; H04L 67/12; H04L 12/14; H04L 63/102; H04L 63/108;

(Continued)

(56) References Cited

U.S. PATENT DOCUMENTS

| | | | | |
|---|---|---|---|---|
| 7,461,175 B2* | 12/2008 | Ono | ........................ | G06F 3/16 |
| | | | | 719/310 |
| 11,418,663 B2* | 8/2022 | Kondo | ............... | H04N 1/00413 |

(Continued)

FOREIGN PATENT DOCUMENTS

JP     2021140736 A     9/2021

*Primary Examiner* — Negussie Worku
(74) *Attorney, Agent, or Firm* — Canon U.S.A., Inc. IP Division

(57) ABSTRACT

If a password set in a printer is changed by an operation performed from an external apparatus such as a smartphone via a remote user interface (UI), the printer changes the password set in the printer on the condition that a predetermined user operation is performed on an operation panel of the printer.

15 Claims, 14 Drawing Sheets

(58) Field of Classification Search
CPC ..... H04L 67/04; H04L 67/125; H04L 67/131; H04L 67/535; H04L 2209/56; H04L 2209/80; H04L 2209/84; H04L 9/321; H04L 9/3226; H04L 63/1441; H04L 67/02; H04L 2209/606; H04L 2463/102; H04L 41/046; H04L 41/0813; H04L 41/0816; H04L 41/085; H04L 41/0853; H04L 41/0866; H04L 63/0428; H04L 63/0869; H04L 63/1416; H04L 63/20; H04L 63/205; H04L 67/75; H04L 69/329; H04L 9/0833; H04L 9/30; H04L 9/40; H04L 2209/60; H04L 63/0227; H04L 63/0281; H04L 63/083; H04L 63/14; H04L 63/1425; H04L 67/10; H04L 67/1095; H04L 67/306; H04L 9/0844; H04L 9/302; H04L 9/3236; H04L 9/3249; H04L 9/3271; G06Q 50/188; G06Q 20/108; G06Q 20/1085; G06Q 10/087; G06Q 10/10; G06Q 10/20; G11B 20/00086; G11B 20/00115; G11B 20/0021; G11B 20/00231; G11B 20/00246; G11B 20/00253; G11B 20/00449; G11B 20/00818; G11B 20/00884; G05B 23/0267

USPC ....................................................... 358/1.15
See application file for complete search history.

(56) References Cited

U.S. PATENT DOCUMENTS

| | | | | |
|---|---|---|---|---|
| 2009/0091791 | A1* | 4/2009 | Ferlitsch | H04N 1/4433 |
| | | | | 358/1.15 |
| 2012/0096530 | A1* | 4/2012 | Hirose | G06F 21/31 |
| | | | | 726/7 |
| 2015/0227197 | A1* | 8/2015 | Nomura | G06F 3/04842 |
| | | | | 345/156 |
| 2016/0044044 | A1* | 2/2016 | Takamiya | H04L 63/10 |
| | | | | 726/7 |
| 2018/0004922 | A1* | 1/2018 | Suzuki | G06F 21/608 |
| 2019/0095141 | A1* | 3/2019 | Yoshihara | G06F 3/0488 |
| 2020/0310728 | A1* | 10/2020 | Kawai | G06F 3/1222 |
| 2021/0274061 | A1* | 9/2021 | Chiba | H04N 1/4433 |
| 2022/0116507 | A1* | 4/2022 | Dohi | H04N 1/00477 |
| 2022/0131993 | A1* | 4/2022 | Chiba | H04N 1/00973 |
| 2023/0269339 | A1* | 8/2023 | Ishii | H04W 12/06 |
| | | | | 358/1.15 |
| 2023/0336672 | A1* | 10/2023 | Iwatsuka | H04N 1/444 |

* cited by examiner

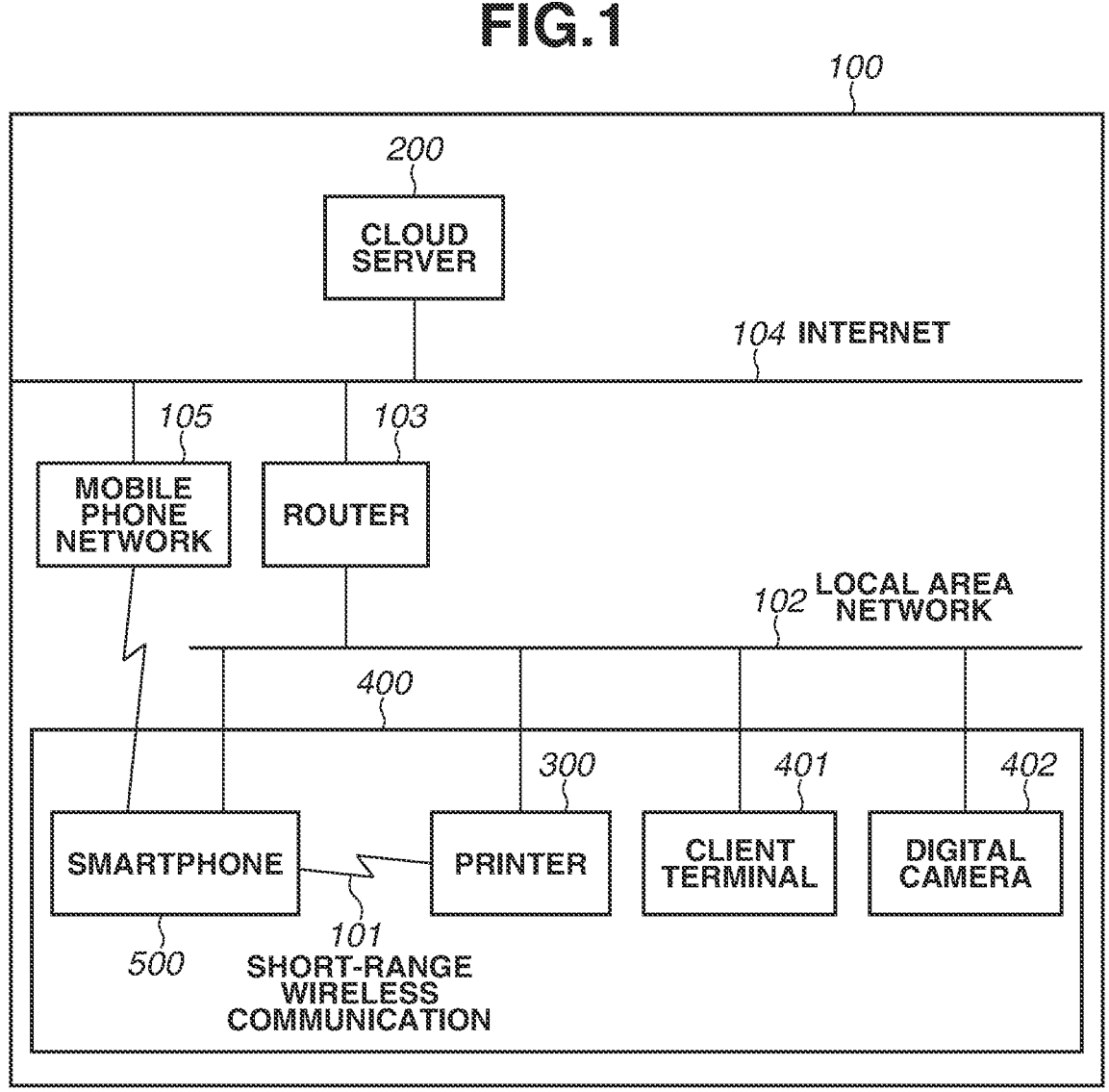

OVERALL EXTERNAL VIEW

EXTERNAL TOP VIEW

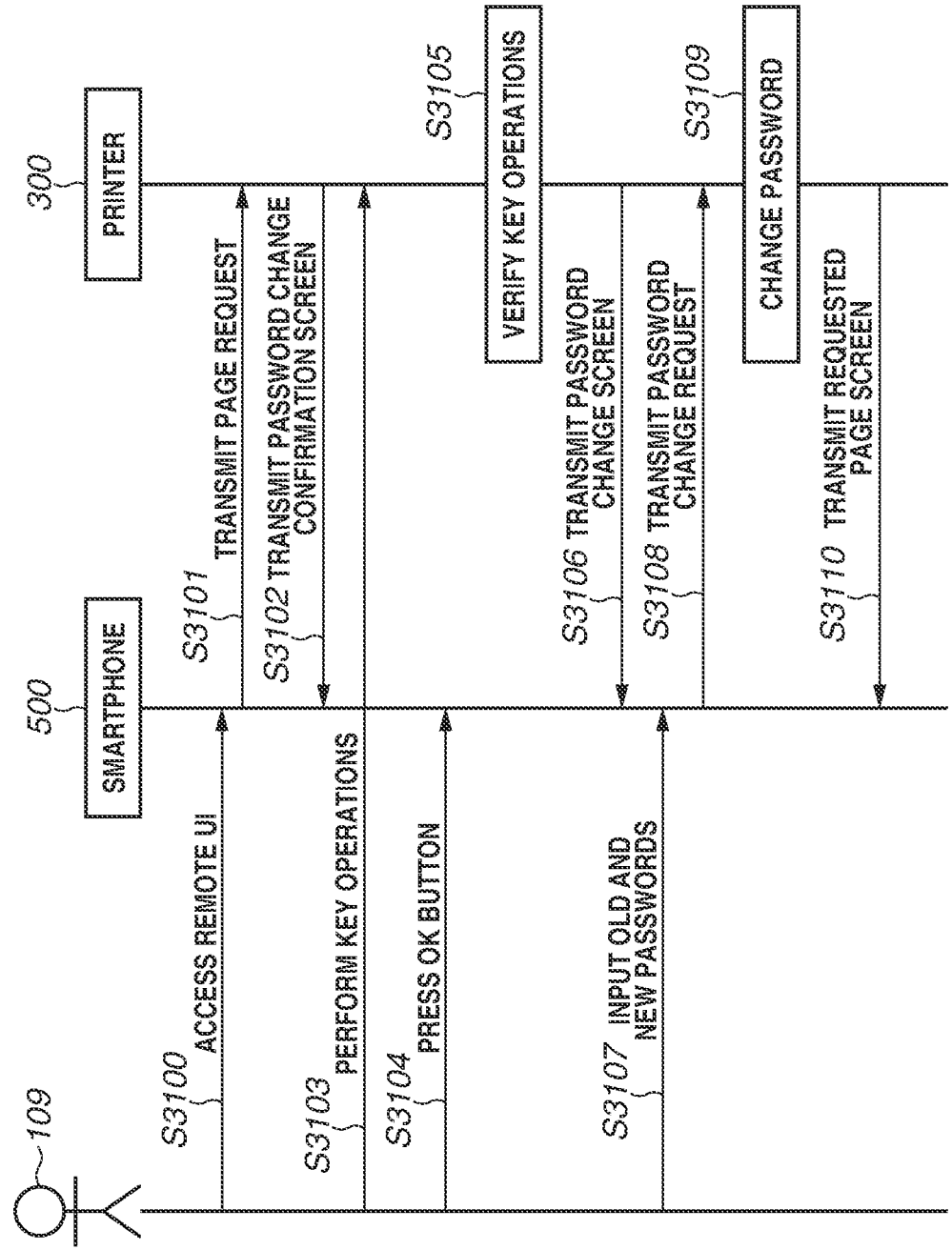

INFORMATION PROCESSING APPARATUS, CONTROL METHOD OF INFORMATION PROCESSING APPARATUS, AND STORAGE MEDIUM

BACKGROUND

Field of the Disclosure

The present disclosure relates to control of an information processing apparatus, and more particularly to the control of an information processing apparatus for which settings can be made from an external device connected via a network.

Description of the Related Art

For network-connectable information processing apparatuses, installation settings for using the apparatuses, such as a network connection setting, and parameter settings for operating the apparatuses are to be made.

However, some small-sized inexpensive information processing apparatuses do not have a display unit or operation unit to be used in making the settings. Such information processing apparatuses provide means for making the installation settings and the parameter settings from an external apparatus connected via a network. Specifically, the information processing apparatuses provide a screen intended for setting operations to a web browser running on the external apparatus, receive results of operations performed on the web browser, and apply the results to themselves. Such means will hereinafter be referred to as a "remote user interface (UI)".

The remote UI can be used to make installation settings and parameter settings even if an information processing apparatus does not have a display screen or input operation unit. However, a malicious third party can connect to the information processing apparatus from outside over the network and take an unauthorized look at the settings or change the settings. The remote UI is therefore typically accompanied with a password authentication function and configured so that the remote UI can only be used by an authorized administrator.

As the Internet and wireless local area network (LAN) techniques become prevalent, the types and numbers of network-connectable apparatuses are increasing dramatically. With such information processing apparatuses readily available, more and more information processing apparatuses connected to a network without appropriate password settings are targeted for attack from malicious third parties.

For network-connectable information processing apparatuses, there have therefore been growing demands for random password settings that vary from one apparatus to another upon shipment and provision of a function of mandatory password change upon first use.

For example, Japanese Patent Application Laid-Open No. 2021-140736 discusses a technique for restricting remote operations if the password is an initial password and making all the remote operations usable if the user sets a new password.

However, the technique discussed in Japanese Patent Application Laid-Open No. 2021-140736 involves operating the operation panel of the apparatus main body to change the initial password.

The technique discussed in Japanese Patent Application Laid-Open No. 2021-140736 therefore is not seen to discuss securely changing the password if the apparatus main body does not include an operation panel capable of password setting.

SUMMARY

The present disclosure is directed to providing a mechanism for enabling a secure password change upon first use of a remote user interface (UI) of an apparatus even if an apparatus main body is not capable of accepting input of a password.

According to an aspect of the present disclosure, an information processing apparatus includes an operation section including at least one operation unit, a communication unit configured to communicate with an external apparatus, the information processing apparatus having a function of a remote user interface (UI) configured to receive an operation from the external apparatus via the communication unit, one or more computer-readable storage media, and one or more processors, wherein the one or more processors and the one or more computer-readable storage media are configured to restrict use of the remote UI from the external apparatus until authentication using a password set in the information processing apparatus is performed from the external apparatus, and if the set password is changed by an operation performed from the external apparatus via the remote UI, change the password set in the information processing apparatus on a condition that a predetermined user operation is performed on the operation section.

Further features of various embodiments will become apparent from the following description of exemplary embodiments with reference to the attached drawings.

BRIEF DESCRIPTION OF THE DRAWINGS

FIG. 1 is a diagram illustrating a configuration of a system according to a first exemplary embodiment.

FIG. 13 is a sequence diagram illustrating information exchange between the printer and a smartphone according to the second exemplary embodiment.

DESCRIPTION OF THE EMBODIMENTS

Figure 2A:
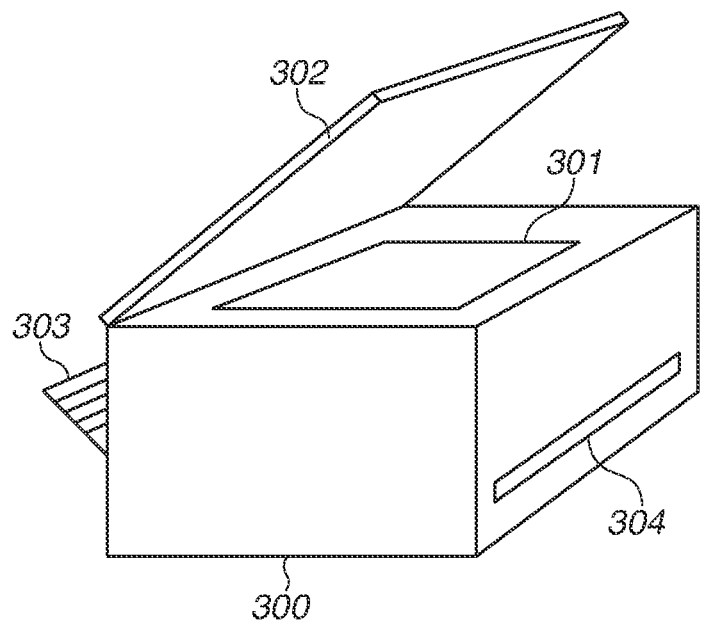
FIGS. 2A and 2B are diagrams illustrating the appearance of a printer according to the present exemplary embodiment.

Exemplary embodiments of the present disclosure will be described in detail below. Components described in the exemplary embodiments merely demonstrate exemplary modes of the present disclosure, and the scope of every embodiment of the disclosure is not limited thereto.

FIG. 1 is a diagram illustrating an example of a configuration of a system 100 according to a first exemplary embodiment.

In FIG. 1, the system 100 includes a cloud server 200 and a device group 400 connected via a local area network 102 and the Internet 104.

The device group 400 includes various network-connectable apparatuses (devices).

Examples of the apparatuses included in the device group 400 include a smartphone 500, a printer 300, a client terminal 401 (such as a personal computer and a workstation), and a digital camera 402. The types of apparatuses included in the device group 400 are not limited thereto. For example, network-connectable home appliances, such as a refrigerator, a television set, and an air conditioner, may be included as well as cameras and navigation systems.

The apparatuses included in the device group 400 are connected to each other via the local area network 102, and can connect to the Internet 104 via a router 103 installed on the local area network 102.

While the router 103 here is depicted as a device connecting the local area network 102 and the Internet 104, the router 103 may have a wireless local area network (LAN) access point function and constitute the LAN 102. In such a case, the apparatuses in the device group 400 can be configured to join the LAN 102 by connecting to an access point over a wireless LAN, aside from connecting to the router 103 over a wired LAN. For example, the printer 300 and the client terminal 401 can be configured to be connected over a wired LAN, and the smartphone 500 and the digital camera 402 can be configured to be connected over a wireless LAN.

The apparatuses in the device group 400 can also mutually communicate with the cloud server 200 over the Internet 104 connected via the router 103. The apparatuses in the device group 400 can also communicate with each other via the LAN 102. The smartphone 500 and the printer 300 can communicate by short-range wireless communication 101. Examples of the short-range wireless communication 101 may include wireless communications compliant with the Bluetooth® standards and near-field communication (NFC) standards. The smartphone 500 is also connected to a mobile phone network 105, and can communicate with the cloud server 200 via the mobile phone network 105. Such a configuration merely demonstrates an exemplary embodiment, and the same effects of the present exemplary embodiment can be obtained from different configurations. For example, while the router 103 is described to have the access point function, an access point may be constituted by an apparatus different from the router 103.

Figure 2B:
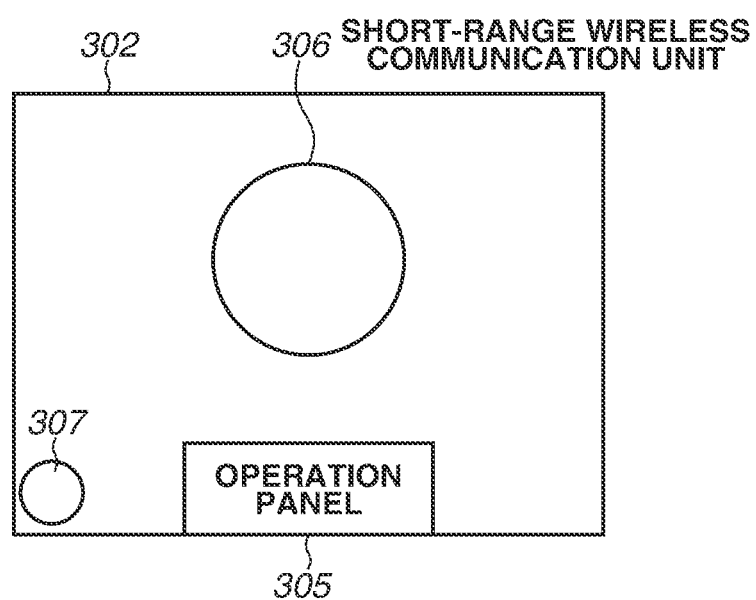

FIGS. 2A and 2B are diagrams illustrating an example of the appearance of the printer 300. In the present exemplary embodiment, a multifunction printer (MFP) having a scanner and other functions in addition to a printer function is described as an example of the printer 300.

FIG. 2A corresponds to a perspective view illustrating the entire printer 300.

In FIG. 2A, a document platen 301 is a transparent glass platen and used in reading a document placed thereon using a scanner. A document platen pressure plate 302 is a cover for pressing the document onto the document platen 301 to not be separated therefrom in reading the document using the scanner, and shielding a scanner unit from external light. A print sheet insertion port 303 is an insertion port where sheets in various sizes can be set. The sheets set here are conveyed to a printing unit one by one, given desired printing, and discharged from a print sheet discharge port 304.

FIG. 2B corresponds to a top view of the printer 300.

As illustrated in FIG. 2B, an operation panel 305 and a short-range wireless communication unit 306 are disposed on top of the document platen pressure plate 302. The short-range wireless communication unit 306 is a unit for performing short-range wireless communication, and can communicate with a partner short-range wireless communication unit located within a predetermined distance. A wireless LAN antenna 307 is an antenna for connecting to and communicating with the LAN 102 using a wireless LAN. The wireless LAN antenna 307 is embedded in the printer 300 at the illustrated position.

Figure 3:
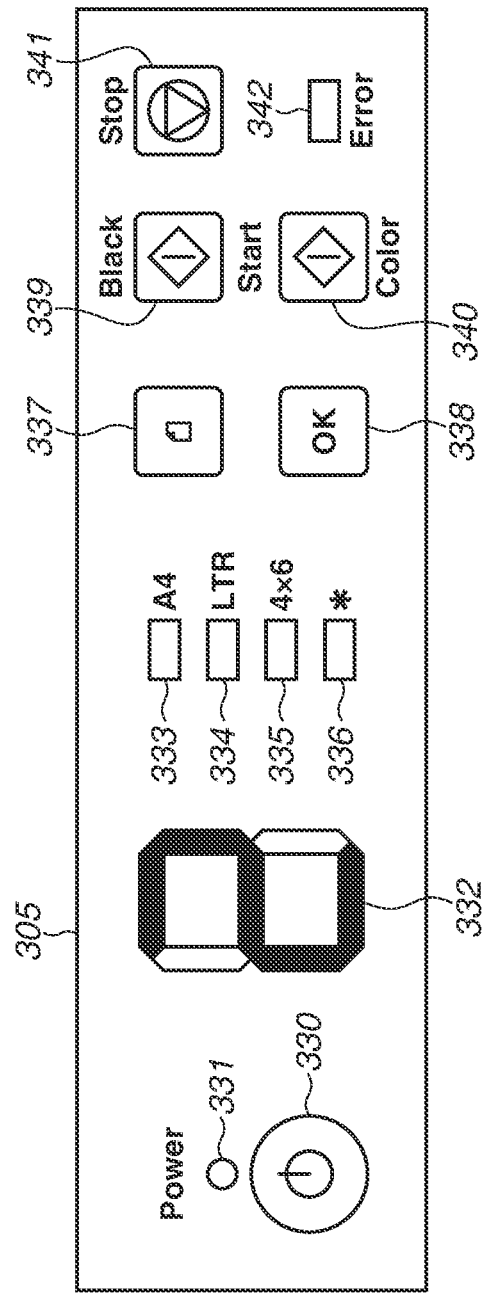
FIG. 3 is a diagram illustrating a configuration of an operation panel of the printer according to the present exemplary embodiment.

FIG. 3 is a diagram illustrating an example of a configuration of the operation panel 305 of the printer 300.

The operation panel 305 includes display lamps using light-emitting diodes (LEDs), and keys for receiving operations. In the example, the operation panel 305 according to the present exemplary embodiment does not include a liquid crystal display capable of graphical display or a touch panel function.

A power key 330 is a key for making power-on and -off operations. If the power key 330 is pressed in a power-off state, the printer 300 enters a power-on state. If the power key 330 is pressed in the power-on state, the printer 300 enters the power-off state. If the power key 330 is pressed during a printing or other operation, the printer 300 enters the power-off state after completion or cancellation of the running processing.

A power lamp 331 is a lamp indicating the power state of the printer 300. The power lamp 331 turns on in the power-on state, and turns off in the power-off state. The power lamp 331 may be configured to blink during operation, during power-on processing, and/or during power-off processing.

A number of copies display unit 332 is an indicator displaying the number of copies to be printed by a copy operation, etc. The number of copies display unit 332 includes a seven-segment LED and can display a numeral of 0 to 9 by controlling the segments on and off.

Four sheet selection lamps 333, 334, 335, and 336 are disposed next to the number of copies display unit 332. The A4 sheet selection lamp 333 indicates that A4 sheets are selected. The Letter (LTR) sheet selection lamp 334 indicates that Letter sheets are selected. A 4-by-6 (4×6) sheet selection lamp 335 indicates that 4×6 photo print sheets are selected. To a registered sheet selection lamp 336 marked with "*", the size and type of sheets to be used can be registered, and the registered sheet selection lamp 336 indicates that the registered sheets are selected.

While the operation panel 305 is configured so that the LED lamps are located next to the physically printed or inscribed indications of sheet sizes and can explicitly indicate the selected sheets, other configurations may be employed. For example, the lamps may be built in the sheet size indications themselves, and the selected sheets may be indicated by the indications being turned on and off. Components other than LED lamps may be used for display.

A sheet selection key 337 is a key for switching among and selecting from the four types of sheets in order.

An OK key 338 is used to finalize the sheet selection after the display of the sheets to be selected is switched using the sheet selection key 337. The OK key 338 can also be used for other purposes depending on the device state of the printer 300.

A monochrome start key 339 and a color start key 340 are keys for starting a print operation to be run by the printer 300 alone, such as a copy function. If the monochrome start key 339 is pressed in a power-on standby state, the printer 300 executes a monochrome copy operation. If the color start key 340 is pressed in the power-on standby state, the printer 300 executes a color copy operation. The monochrome start key 339 and the color start key 340 can also be used to execute other operations or processing depending on the device state of the printer 300 and/or a combination of operations with other keys.

A stop key 341 is a key for cancelling the operation or processing being executed, and returning to a standby state. If the stop key 341 is pressed in an error state, the error or the job being executed can be cancelled.

An error lamp 342 is a lamp indicating the error state of the printer 300. The error lamp 342 turns off in a normal state, and turns on or blinks in the event of an error. Possible types of error include an ink-out error, a paper-out error, and a paper jam error. The types of error can be notified using blink patterns of the error lamp 342. Alternatively, the types of error and the methods for handling the error can be notified to the user by control of display of the number of copies display unit 332 in combination with the lighting or blinking of the error lamp 342.

Figure 4:
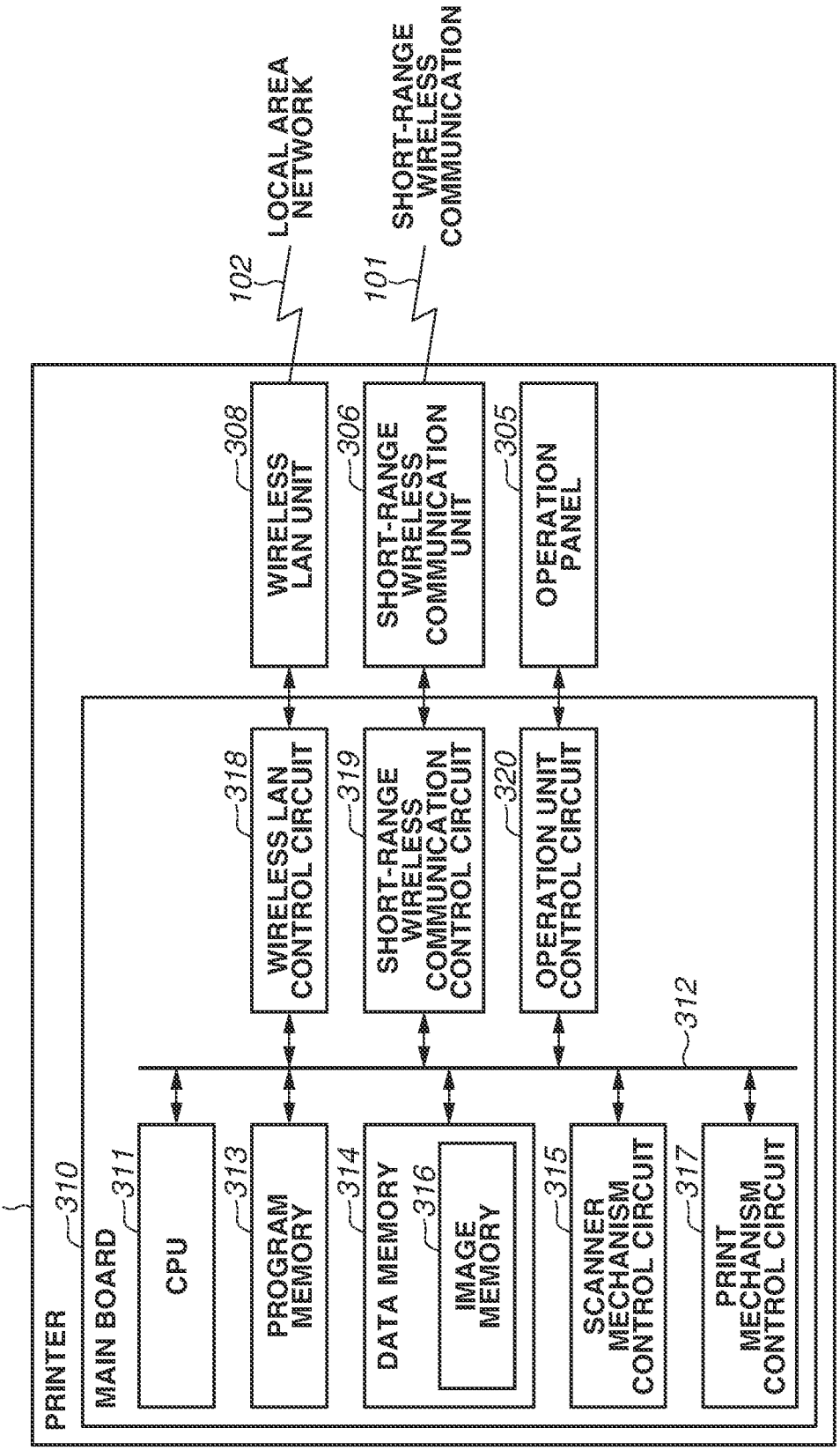
FIG. 4 is a block diagram illustrating a configuration of the printer according to the present exemplary embodiment.

FIG. 4 is a block diagram illustrating an example of a configuration of the printer 300.

The printer 300 includes a main board 310 that controls the entire apparatus, a wireless LAN unit 308, and the short-range wireless communication unit 306.

A central processing unit (CPU) 311 in microprocessor form disposed on the main board 310 operates based on a control program stored in a program memory 313 in read-only memory (ROM) form and the content of a data memory 314 in random access memory (RAM) form connected via an internal bus 312.

The CPU 311 reads a document by controlling a scanner mechanism control circuit 315, and stores the read image in an image memory 316 in the data memory 314. The CPU 311 can print an image stored in the image memory 316 in the data memory 314 on a recording medium by controlling a print mechanism control circuit 317. The CPU 311 performs wireless LAN communication with another communication terminal apparatus by controlling the wireless LAN unit 308 via a wireless LAN control circuit 318. The CPU 311 can detect connection with another short-range wireless communication terminal and transmit and receive data to and from another short-range wireless communication terminal by controlling the short-range wireless communication unit 306 via a short-range wireless communication control circuit 319. The wireless LAN unit 308 and the short-range wireless communication unit 306 function as communication units for communicating with external apparatuses, such as the smartphone 500 and the client terminal 401.

Figure 5:
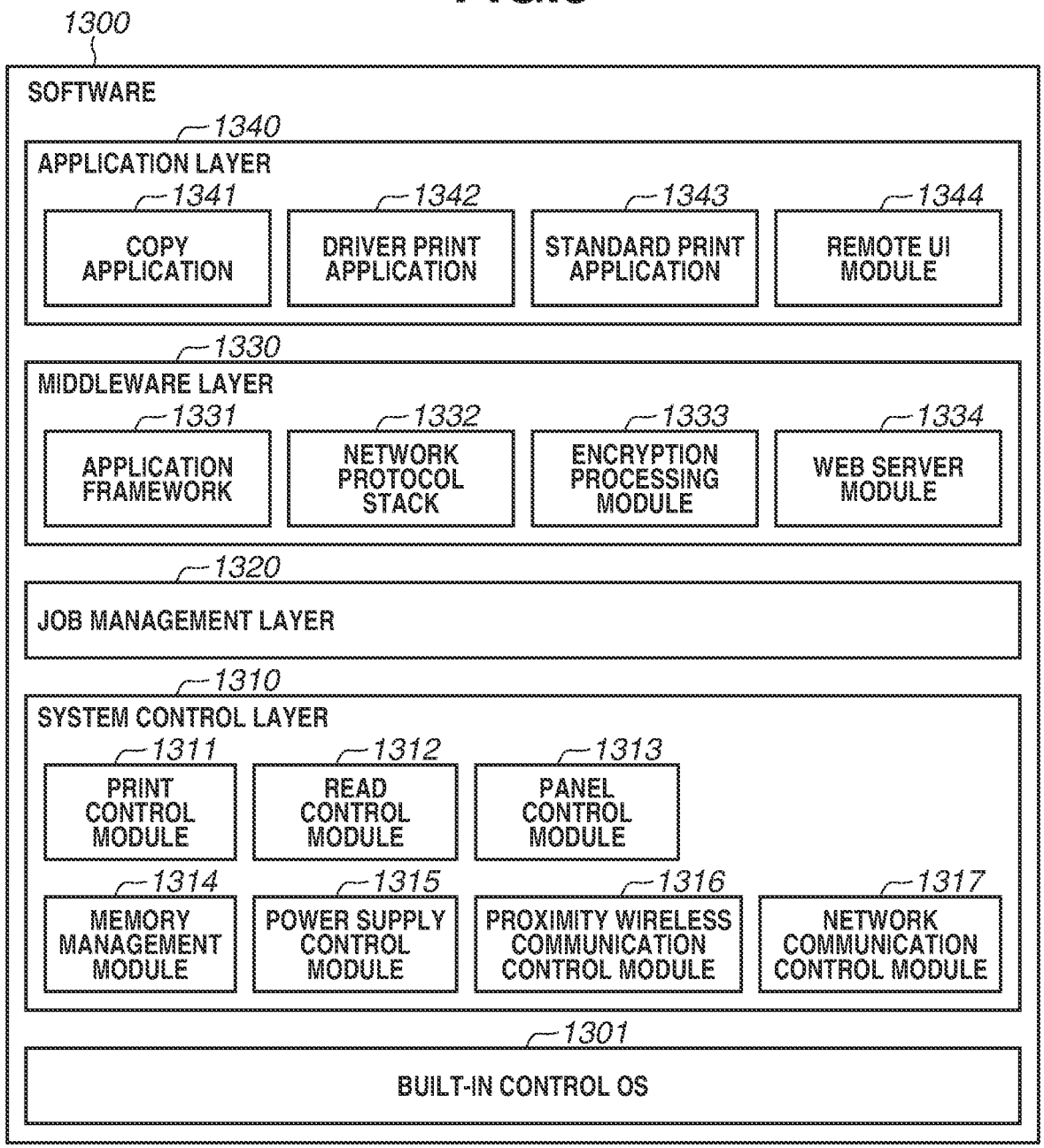
FIG. 5 is a diagram illustrating a module configuration of software running on the printer according to the present exemplary embodiment.

FIG. 5 is a diagram illustrating an example of a module configuration of software running on the printer 300. The functions of the software modules illustrated in FIG. 5 are implemented by the CPU 311 executing programs stored in the program memory 313.

Software 1300 running on the printer 300 operates on a built-in control operating system (OS) 1301. The modules of the software 1300 are broadly classified into a system control layer 1310, a job management layer 1320, a middleware layer 1330, and an application layer 1340.

The built-in control OS 1301 is an OS that controls basic operations of the software (printer control software) 1300. A highly responsive real-time OS is typically used.

The system control layer 1310 is a module group mainly in charge of hardware control on the printer 300.

A print control module 1311 is a control module for controlling the print mechanism control circuit 317 to perform a print operation of the printer 300. A read control module 1312 is a control module for controlling the scanner mechanism control circuit 315 to perform an operation for reading a document placed on the document platen 301. A panel control module 1313 is a control module for controlling display on the operation panel 305 on the printer 300 and detecting various key operations.

A memory control module 1314 is a control module for managing dynamic allocation of the data memory 314 and the image memory 316. A power supply control module 1315 is a control module for performing power supply control of the printer 300 to supply operating power to various hardware blocks and perform power saving mode control. A proximity wireless communication control module 1316 is a control module for controlling the short-range wireless communication unit 306 to communicate with a terminal apparatus, such as the smartphone 500. A network communication control module 1317 is a control module for controlling the wireless LAN unit 308 to perform communication physical layer control intended for LAN communication with an external apparatus.

The job management layer 1320 is a module group that executes various operations using the system control layer 1310 while performing hardware resource allocation, exclusive control, and scheduling in response to job execution requests from the upper layers.

The middleware layer 1330 is a module group that is located between the application layer 1340 and the job management layer 1320 and includes modules used in common by a plurality of functional modules in the application layer 1340.

An application framework 1331 is a framework module used in common when the application layer 1340 requests job execution from the job management layer 1320. A network protocol stack 1332 is a module for performing communication compliant with various network protocols such as the Hypertext Transfer Protocol (HTTP) and the Transmission Control Protocol/Internet Protocol (TCP/IP). An encryption processing module 1333 is a module for performing encryption and decryption for network communication. A web server module 1334 is a module for operating the printer 300 as a web server to distribute remote user interface (UI) content.

The application layer 1340 is an application group for implementing various functions of the printer 300.

A copy application 1341 is an application module for performing a copy operation of reading a document and printing a duplicate. A driver print application 1342 is an application module for receiving a job from a printer driver of the smartphone 500 or the client terminal 401 and executing the operation. Examples of the job from the printer driver include a print job to execute a print operation, a scan job to read a document and output image data, and a maintenance job to exchange information with an external apparatus and make settings or perform management of the printer 300.

A standard print application 1343 is an application module that receives a job from a standard print service on the system of the smartphone 500 and executes the operation. Examples of the job from the standard print service include a print job to execute a print operation and a scan job to read a document and output image data. Since the standard print service is provided by a smartphone manufacturer or a standard OS vendor, there is a limit that the standard print service is unable to make settings or perform management specific to each individual manufacturer's printer models.

A remote UI module 1344 is a module that provides an external apparatus with a remote UI function of the printer 300 using the web server module 1334. The printer 300 can be set and managed by using a remote UI. In particular, since the printer 300 described in the present exemplary embodiment can only display and set limited information on the operation panel 305, the remote UI is used to perform more detailed setting and management. If the smartphone 500 or the client terminal 401 is not provided with a dedicated driver but only the standard print service, the remote UI is to be used to perform detailed setting and management.

Figure 6:
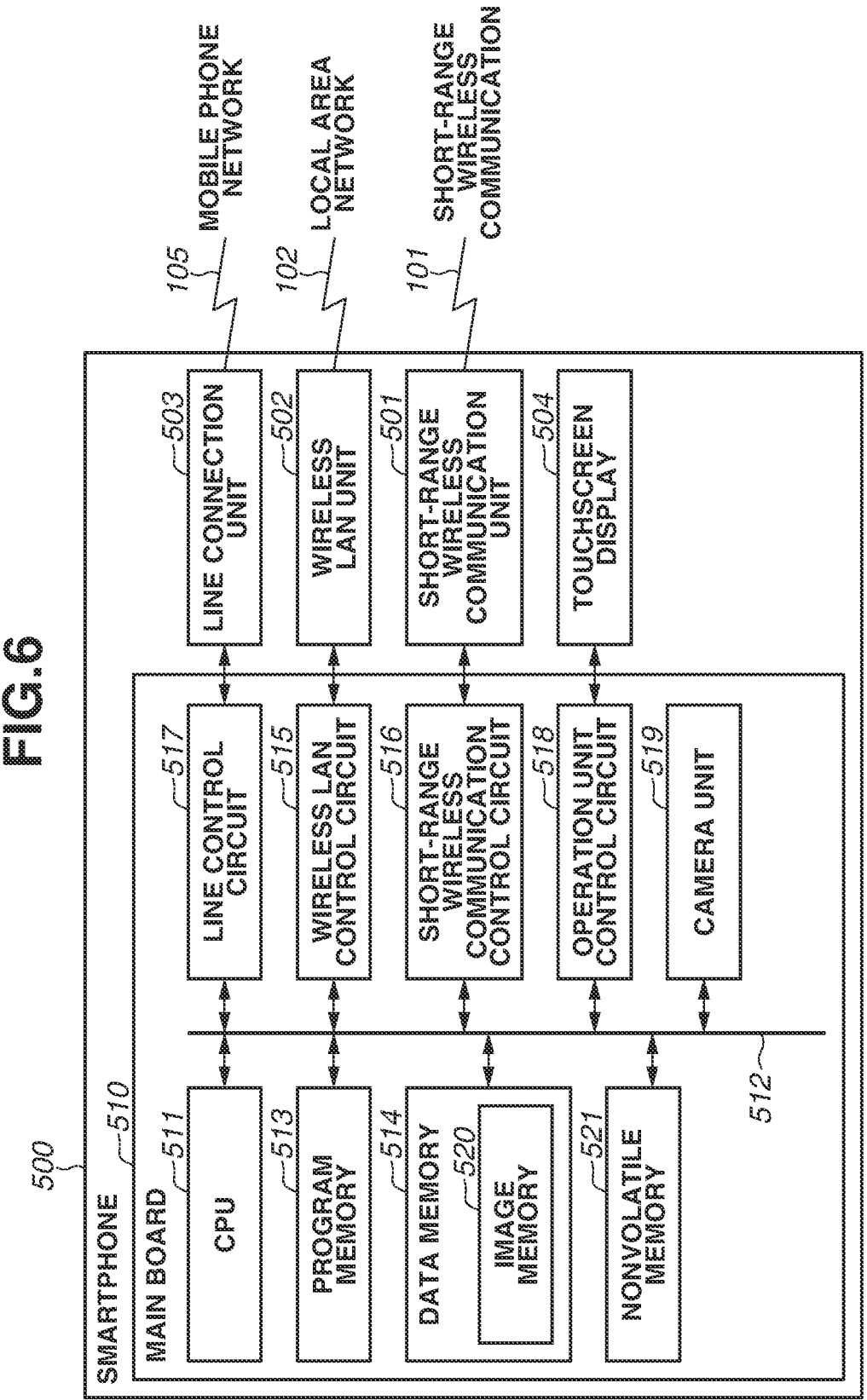
FIG. 6 is a block diagram illustrating a configuration of a smartphone according to the present exemplary embodiment.

FIG. 6 is a block diagram illustrating an example of a configuration of the smartphone 500.

The smartphone 500 includes a main board 510 that controls the entire apparatus, a wireless LAN unit 502, a short-range wireless communication unit 501, and a line connection unit 503.

A CPU 511 in microprocessor form disposed on the main board 510 operates based on a control program stored in a program memory 513 in ROM form and the content of a data memory 514 in RAM form connected via an internal bus 512.

The CPU 511 performs wireless LAN communication with another communication terminal apparatus by controlling the wireless LAN unit 502 via a wireless LAN control circuit 515. The CPU 511 can detect connection with another short-range wireless communication terminal and transmit and receive data to and from the other short-range wireless communication terminal by controlling the short-range wireless communication unit 501 via a short-range wireless communication control circuit 516. The CPU 511 can connect to the mobile phone network 105 and make a call or transmit and receive data by controlling the line connection unit 503 via a line control circuit 517.

The CPU 511 can provide desired display on a touchscreen display 504 and receive user's operations by controlling an operation unit control circuit 518. The CPU 511 can capture an image by controlling a camera unit 519, and stores the captured image in an image memory 520 in the data memory 514. The CPU 511 can also store images obtained from outside via the mobile phone network 105, the LAN 102, and the short-range wireless communication 101 in the image memory 520 aside from the captured image, and transmit images to the outside the other way around.

A nonvolatile memory 521 includes a flash memory and stores data to be retained even after power-off. Examples of the data stored in the nonvolatile memory 521 include phonebook data, various types of communication connection information, and device information about devices connected in the past, as well as image data to be retained and application software for implementing various functions of the smartphone 500.

Figure 7:
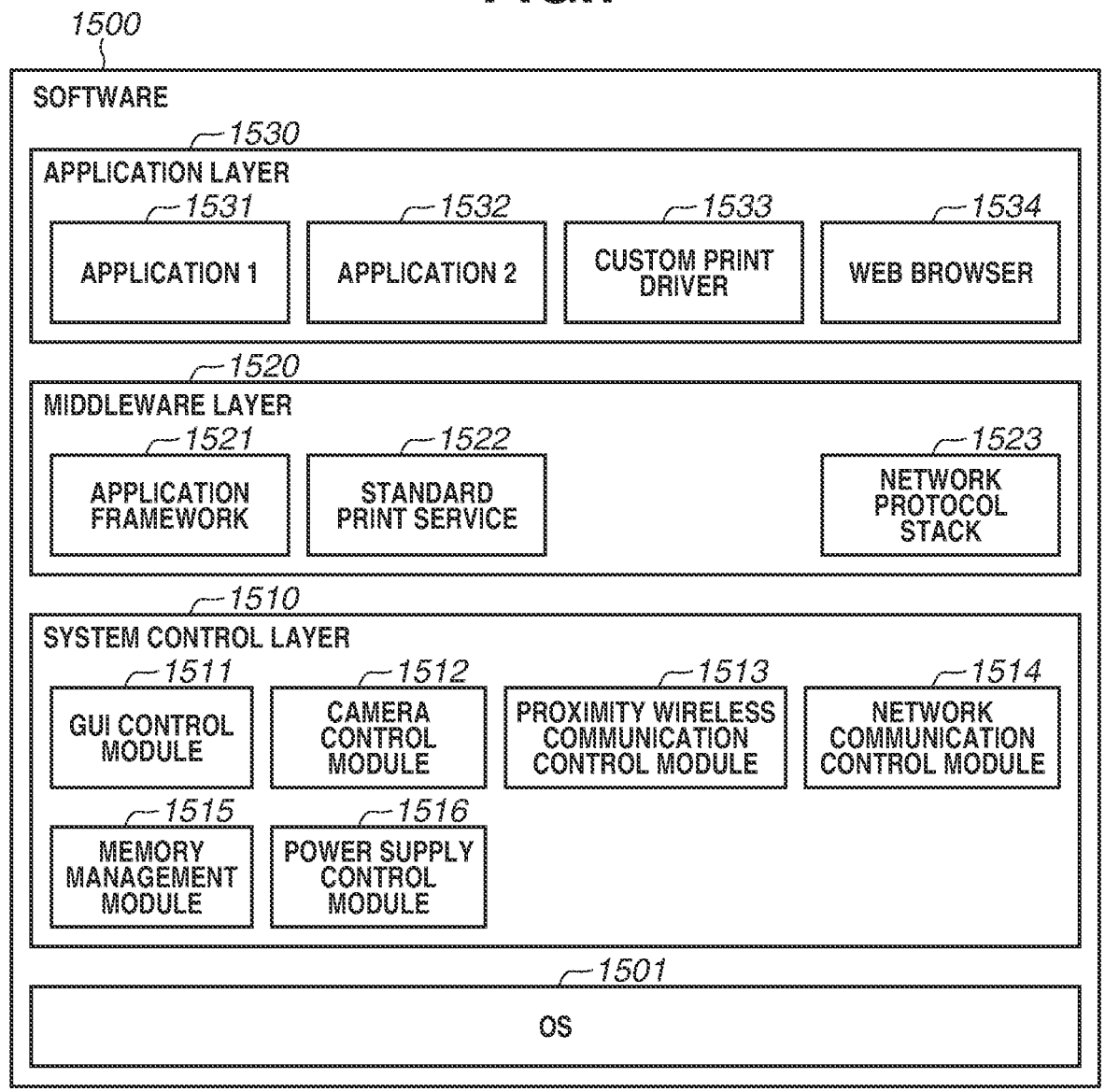
FIG. 7 is a diagram illustrating a module configuration of software running on the smartphone according to the present exemplary embodiment.

FIG. 7 is a diagram illustrating an example of a module configuration of software running on the smartphone 500. The functions of the software modules illustrated in FIG. 7 are implemented by the CPU 511 executing programs stored in the program memory 513.

Software 1500 running on the smartphone 500 operates on an OS 1501. The modules of the software 1500 are broadly classified into a system control layer 1510, a middleware layer 1520, and an application layer 1530.

The system control layer 1510 is a module group mainly in charge of hardware control on the smartphone 500.

A graphical user interface (GUI) control module 1511 is a control module for controlling display on the touchscreen display 504 and detecting touchscreen operations. A camera control module 1512 is a module for controlling imaging by the camera unit 519.

A proximity wireless communication control module 1513 is a control module for controlling the short-range wireless communication unit 501 to perform proximity wireless communication with another apparatus. A network communication control module 1514 is a control module for controlling the wireless LAN unit 502 to perform communication physical layer control intended for wireless LAN communication with an external apparatus. A memory management module 1515 is a control module for managing dynamic allocation of the data memory 514 and the image memory 520. A power supply control module 1516 is a control module for performing power supply control of the smartphone 500 to supply operating power to various hardware blocks and perform power saving mode control.

The middleware layer 1520 is a module group that is located between the application layer 1530 and the system control layer 1510 and includes modules used in common by a plurality of functional modules in the application layer 1530.

An application framework 1521 is a framework module used in common by the applications in the application layer 1530. A network protocol stack 1523 is a module for performing communication compliant with various network protocols such as the HTTP and TCP/IP. A standard print service 1522 is a service module that provides the applications in the application layer 1530 with functions for using the printer 300 compatible with the standard print service 1522. The functions provided by the standard print service 1522 include a print function of causing the printer 300 to execute a print job, and a scan function of causing the printer 300 to execute a scan job. Since the standard print service 1522 is provided by a smartphone manufacturer or a standard OS vendor, there is a limit that the standard print service 1522 is unable to make settings or perform management specific to individual manufacturer's printer models.

The application layer 1530 is an application group for implementing various functions of the smartphone 500.

The applications implemented in the smartphone 500 include ones that are built in upon product shipment and ones that can be downloaded and installed afterward by the user. While the diagram illustrates an application 1, 1531, and an application 2, 1532, the number and types of applications to be added are not limited, and the user can add and delete applications as appropriate.

A custom print driver 1533 is a dedicated driver corresponding to a model of the printer 300, and provides the corresponding printer 300 with functions of executing a print job and a scan job. The user selects a custom print driver corresponding to the model of the printer he/she uses, and installs the selected custom print driver. While the custom print driver 1533 here is described to be installed in the application layer 1530, the custom print driver 1533 may be installed in the middleware layer 1520 and configured to operate upon print job requests from the applications.

A web browser 1534 is an application module that connects to a web server via a network, and obtains and displays web content. The web browser 1534 can obtain the web content on the cloud server 200 and display the obtained web content, or obtain the remote UI content using the web server function of the printer 300 and display the obtained remote UI.

Figure 8A:
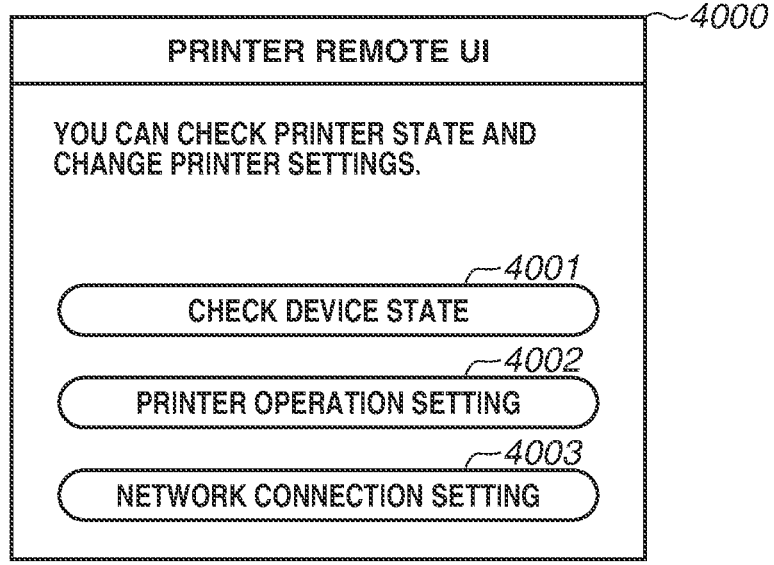
FIGS. 8A, 8B, 8C, 8D, and 8E are diagrams illustrating remote user interface (UI) screens according to the present exemplary embodiment.
Figure 8B:
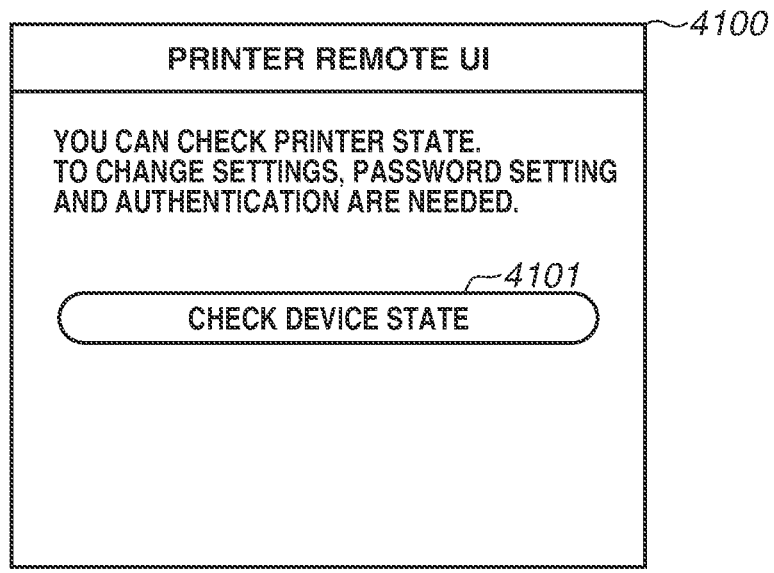

FIGS. 8A and 8B are diagrams illustrating examples of remote UI screens.

FIG. 8A is a diagram illustrating an example of a screen 4000 where the remote UI is not restricted.

The unrestricted screen 4000 is an entry page of the entire remote UI to be displayed if password authentication has been completed. The unrestricted screen 4000 includes buttons 4001, 4002, and 4003 hyperlinked to transition to other pages. The button 4001 is a button for transitioning to a not-illustrated printer state display screen. The button 4002 is a button for transitioning to a not-illustrated printer operation setting screen. The button 4003 is a button for transitioning to a not-illustrated network connection setting screen.

FIG. 8B is a diagram illustrating an example of a screen 4100 where the remote UI is restricted.

The restricted screen 4100 is an entry page displayed instead of the unrestricted screen 4000 if the password authentication has not been completed or the password in a factory shipment state has not been changed. The state where the password in the factory shipment state has not been changed will hereinafter be referred to as an "initial state". The restricted screen 4100 includes a button 4101 hyperlinked to transition to another page. The button 4101 is a button for transitioning to the not-illustrated printer state display screen. As can be seen from above, the restricted screen 4100 does not include a button for transitioning to the printer operation setting screen or the network connection setting screen. The restricted screen 4100 is configured so that a remote attacker is unable to make an unauthorized change in the printer operation settings or the network connection settings when the printer 300 is used without password authentication or in the initial state.

Figure 8C:
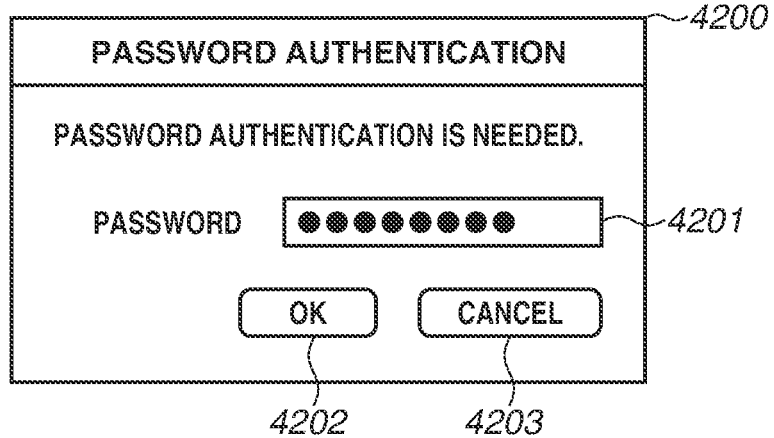

FIG. 8C is a diagram illustrating an example of an authentication screen 4200.

The authentication screen 4200 is a screen displayed when a remote UI access request is issued before the password authentication. A password field 4201 is a character string input field for inputting a password for authentication. Here, input characters are converted into and displayed as black circles to keep the input password from eyes peeking at the user's terminal.

An OK button 4202 is a button for transmitting an authentication request for authentication using the input password. A cancel button 4203 is a button for cancelling the authentication and returning to the restricted remote UI access. The user can transmit the authentication request by inputting the password into the password field 4201 and pressing the OK button 4202. If the authentication request is accepted, the password authentication screen 4200 transitions to a requested remote UI page screen.

Figure 8D:
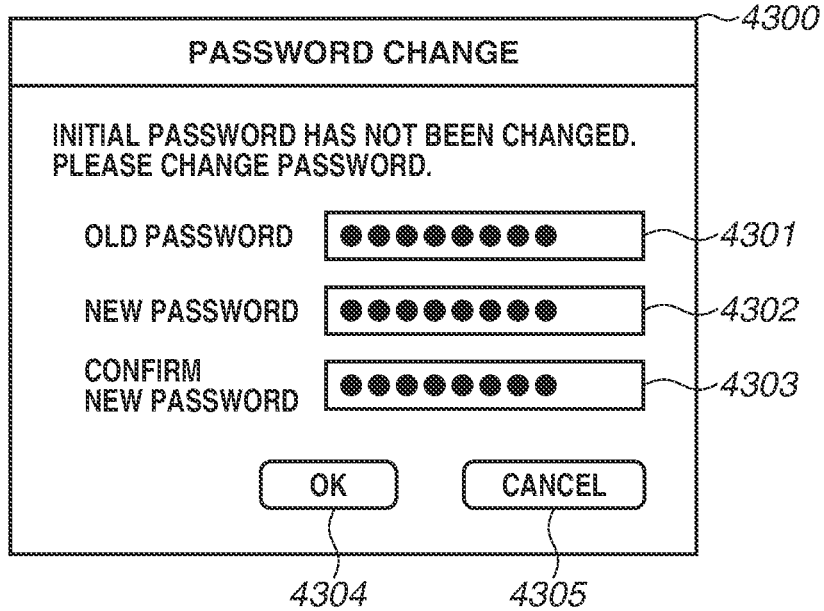

FIG. 8D is a diagram illustrating an example of a password change screen 4300.

The password change screen 4300 is a screen displayed if a remote UI access request is issued in the initial state. An old password field 4301 is a characteristic string input field for inputting a password before a change. A new password field 4302 is a characteristic string input field for inputting a password after the change. A new password confirmation field 4303 is a character string input field for inputting the password after the change. The password before the change input into the old password field 4301 is used to verify that the person attempting to change the password is the legitimate user. The new password input into the new password confirmation field 4303 is used to check that the new password matches the new password input into the new password field 4302 and to verify that there is no input error.

An OK button 4304 is a button for transmitting a password change request using the input old and new passwords. A cancel button 4305 is a button for cancelling the password change and returning to the restricted remote UI access. The user can transmit a password change request by making appropriate inputs into the fields 4301, 4302, and 4303 and pressing the OK button 4304.

Figure 8E:
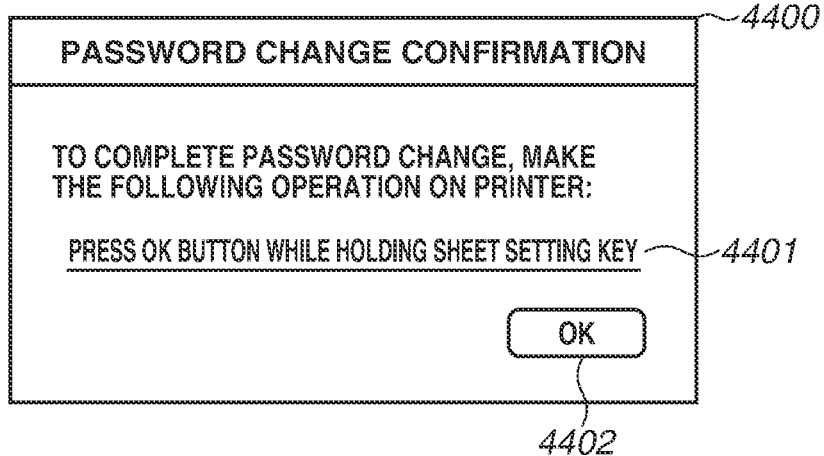

FIG. 8E is a diagram illustrating an example of a password change confirmation screen 4400.

The password change confirmation screen 4400 is a screen displayed if a password change request is transmitted in the initial state by operation on the password change screen 4300. The password change confirmation screen 4400 corresponds to a screen for providing instructions to the user to make a predetermined user operation. The password change confirmation screen 4400 displays instructions 4401 on a predetermined operation method to be performed on the operation panel 305 of the printer 300 to complete the password change. The instructions 4401 on the predetermined operation method include information describing a procedure for the predetermined user operation on the operation panel 305. An OK button 4402 is a button for terminating the password change confirmation screen 4400. Examples of the predetermined user operation for confirming the password change may include simultaneously pressing a plurality of keys, pressing a plurality of keys in predetermined order, pressing a key while holding another key, and long-pressing a specific key for a predetermined time or longer. In other words, the examples of the predetermined user operation to be used to confirm the password change include an operation of a specific operation key on the operation panel 305 or a combination of operations of a plurality of specific keys. The predetermined user operation to be used to confirm the password change may be a fixed one or configured so that the user of the printer 300 can preset the operation. For enhanced security strength, the predetermined user operation to be used to confirm the password change may be configured to be changed at random each time the password change is confirmed.

The password change confirmation screen 4400 may be configured to be automatically terminated (hidden) when a predetermined time has elapsed after display. In such a case, the password change confirmation screen 4400 does not necessarily need to include the OK button 4402.

If the user inputs password change information and presses the OK button 4304 on the password change screen 4300, the password change confirmation screen 4400 appears. If the user checks the password change confirmation screen 4400, operates the operation panel 305 based on the displayed operation method, and presses the OK button 4402 of the password change confirmation screen 4400, the password change is accepted, and the password is updated. The operation on the operation panel 305 is based on the displayed operation method or the pressing operation on the OK button 4402, whichever may be performed first. If such operations are not made within a predetermined period, the password change is cancelled.

Figure 9:
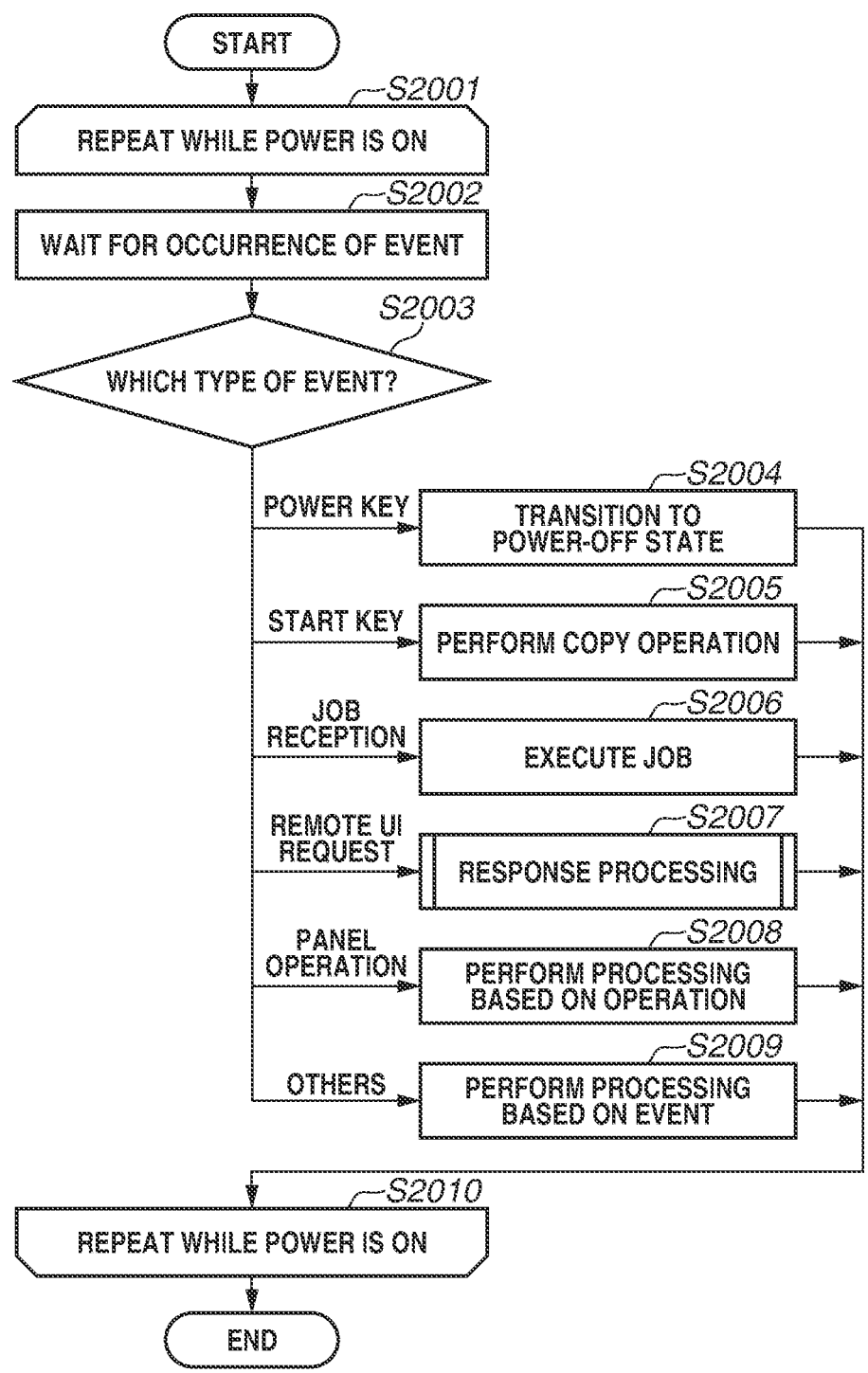
FIG. 9 is a flowchart illustrating details of processing by the printer according to the present exemplary embodiment.

FIG. 9 is a flowchart illustrating an example of details of processing by the printer 300. The processing is performed by the CPU 311 of the printer 300 when the printer 300 is powered on. The processing of steps S2001 to S2010 is repeated while the power of the printer 300 is on. At the beginning of the repetition loop, in step S2002, the CPU 311 of the printer 300 waits for an occurrence of an event.

If the occurrence of an event is detected in step S2002, then in step S2003, the processing branches into appropriate processes depending on the type of event.

If, in step S2003, the event is pressing of the power key 330 on the operation panel 305 (POWER KEY in step S2003), the processing proceeds to step S2004. In step S2004, the printer 300 transitions from the power-on state to the power-off state. The printer 300 thereby exits the repetition loop and enters hibernation until the next power-on.

If, in step S2003, the event is pressing of the start key 339 or 340 on the operation panel 305 (START KEY in step S2003), the processing proceeds to step S2005. In step S2005, the CPU 311 starts a copy operation.

If, in step S2003, the event is reception of a job from outside (JOB RECEPTION in step S2003), the processing proceeds to step S2006. In step S2006, the CPU 311 performs job execution processing based on the content of the received job.

If, in step S2003, the event is reception of a remote UI request from outside (REMOTE UI REQUEST in step S2003), the processing proceeds to step S2007. In step S2007, the CPU 311 performs response processing in receiving the remote UI request to be described below.

If, in step S2003, the event is an operation on the operation panel 305 (PANEL OPERATION in step S2003), the processing proceeds to step S2008. In step S2008, the CPU 311 performs processing based on the performed operation.

If, in step S2003, the event is any other event (OTHERS in step S2003), the processing proceeds to step S2009. In step S2009, the CPU 311 performs processing based on the event.

Figure 10:
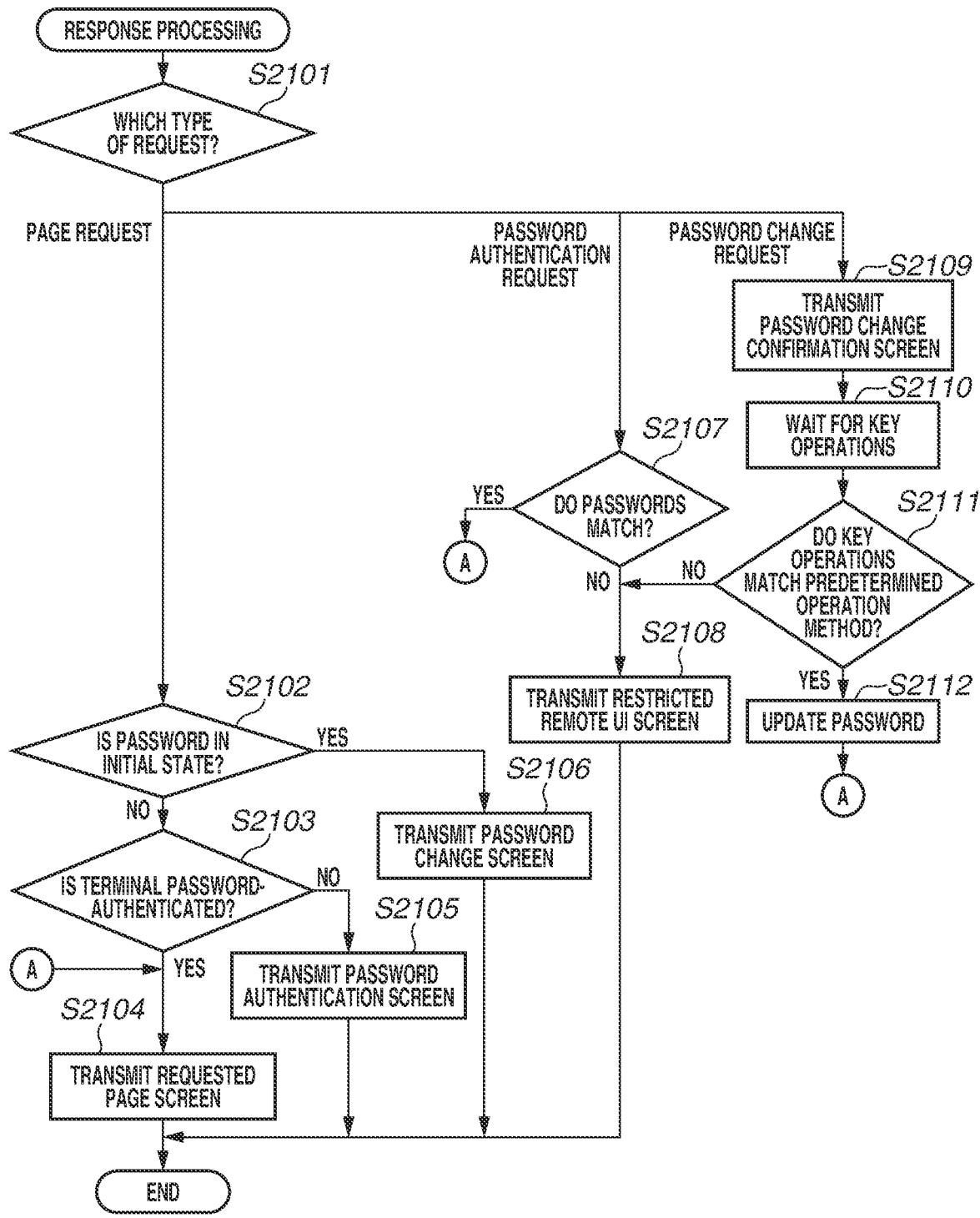
FIG. 10 is a flowchart illustrating details of processing by the printer in receiving a remote UI request according to the first exemplary embodiment.

FIG. 10 is a flowchart illustrating an example of the details of the processing by the printer 300 in receiving a remote UI request according to the first exemplary embodiment. The flowchart illustrates details of the response processing (step S2007) in the flowchart of FIG. 9. In other words, the processing of the flowchart is performed by the CPU 311 of the printer 300 when the occurrence of an event to issue a remote UI request from the web browser 1534 of the external apparatus (smartphone 500) to the web server module 1334 of the printer 300 is detected.

In step S2101, the CPU 311 determines the type of the received remote UI request, and performs processing based on the request type.

If, in step S2101, the request type is a remote UI page screen request (page request) (PAGE REQUEST in step S2101), the processing proceeds to step S2102. In step S2102, the CPU 311 checks whether the password of the printer 300 is in the initial state. In other words, the CPU 311 checks whether the password upon factory shipment has been changed. Specifically, whether a password change operation is made can be stored by use of a flag. If the flag is set, the CPU 311 can determine that the password is not in the initial state. Alternatively, the CPU 311 may compare the password setting upon the factory shipment with the current password setting, and if the password settings are different, determine that the password is not in the initial state.

If the password is in the initial state (YES in step S2102), the processing proceeds to step S2106. In step S2106, the CPU 311 transmits the password change screen 4300 to the requesting terminal.

On the other hand, if the password is not in the initial state (NO in step S2102), the processing proceeds to step S2103. In step S2103, the CPU 311 checks whether the corresponding terminal is password-authenticated.

If the corresponding terminal is password-authenticated (YES in step S2103), the processing proceeds to step S2104. In step S2104, the CPU 311 transmits the requested page screen to the requesting terminal. Specifically, if the requested page screen is the entry screen of the remote UI, the CPU 311 transmits the unrestricted remote UI screen 4000.

On the other hand, if the corresponding terminal is not password-authenticated (NO in step S2103), the processing proceeds to step S2105. In step S2105, the CPU 311 transmits the password authentication screen 4200 to the requesting terminal.

In the foregoing step S2101, if the request type is a password authentication request (PASSWORD AUTHENTICATION REQUEST in step S2101), the processing proceeds to step S2107. In step S2107, the CPU 311 checks whether a password transmitted as the password authentication request matches the password set in the printer 300.

If the passwords match (YES in step S2107), the processing proceeds to step S2104 since the password authentication is successful. In step S2104, the CPU 311 transmits the requested page screen to the requesting terminal.

On the other hand, if the passwords do not match (NO in step S2107), the processing proceeds to step S2108 since the password authentication is failed. In step S2108, the CPU 311 transmits the restricted remote UI screen 4100 to the requesting terminal.

In the foregoing step S2101, if the request type is a password change request (PASSWORD CHANGE REQUEST in step S2101), the CPU 311 verifies the content of the received password change request. If the password change request is a proper one, the processing proceeds to step S2109. In step S2109, if the old password transmitted as the password change request matches the password set in the printer 300 and the new password matches the new password for confirmation, the CPU 311 determines that the password change request is a proper one. Although not illustrated in the flowchart, if the received password change request is erroneous and the number of occurrences of such errors is less than a predetermined number, the processing proceeds to step S2106. If the number of occurrences is greater than or equal to the predetermined number, the processing proceeds to step S2108 or ends, for example.

In step S2110 subsequent to the foregoing step S2109, the CPU 311 waits for a key operation or operations (predetermined user operation) to be performed on the operation panel 305 of the printer 300. If a key operation or operations is/are performed, the processing proceeds to step S2111. In step S2111, the CPU 311 checks whether the key operation(s) performed matches/match the predetermined operation method displayed on the password change confirmation screen 4400.

If the key operation(s) performed matches/match the predetermined operation method (YES in step S2111), the processing proceeds to step S2112. In step S2112, the CPU 311 accepts the password change and updates the password. The processing further proceeds to step S2104 since the terminal is password-authenticated. In step S2104, the CPU 3111 transmits the requested page screen to the requesting terminal.

On the other hand, if the key operation(s) performed does/do not match the predetermined operation method (NO in step S2111), the processing proceeds to step S2108 without updating the password. In step S2108, the CPU 311 transmits the restricted remote UI screen 4100 to the requesting terminal since the password authentication is failed.

The wait for the key operation(s) in the foregoing step S2110 may be configured to not accept the change if the operation(s) is/are not completed within a specific time. If the password change confirmation screen 4400 is configured to be automatically terminated after a lapse of a predetermined time as described above, a confirmation operation may be configured to be received only while the password change confirmation screen 4400 is displayed. Such a configuration can reduce the risk that a key operation or operations matching the predetermined operation method happens/happen to be made and the password is changed in an unauthorized manner if the waiting state is left standing after an unauthorized remote change request.

Figure 11:
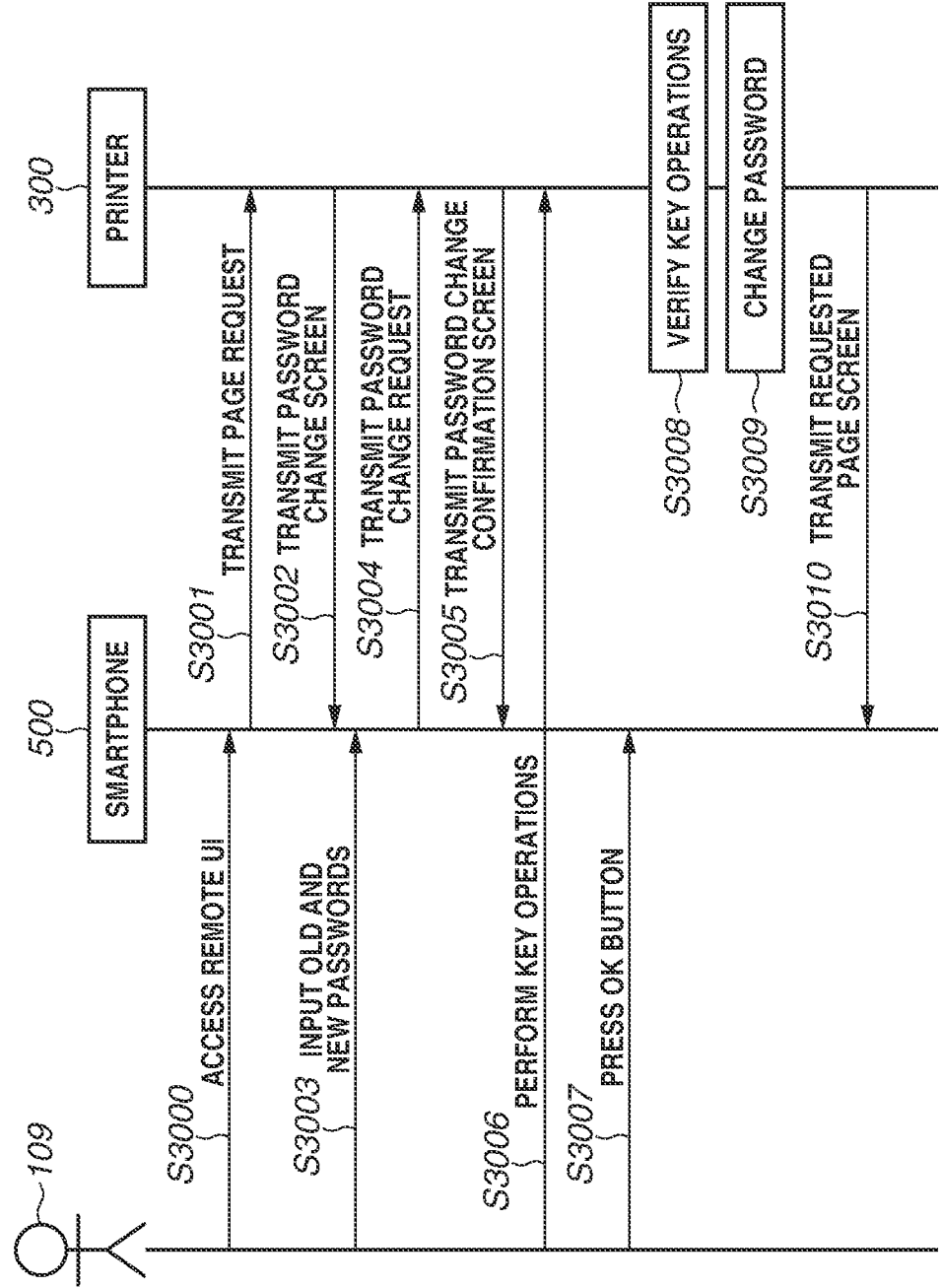
FIG. 11 is a sequence diagram illustrating information exchange between the printer and the smartphone according to the first exemplary embodiment.

FIG. 11 is a sequence diagram illustrating an example of information exchange between the printer 300 and the smartphone 500 according to the first exemplary embodiment. The diagram is a sequence diagram for a case where the password of the printer 300 is in the initial state and a user 109 accesses the remote UI using the smartphone 500.

In step S3000, the user 109 accesses the remote UI by operating the smartphone 500. In step S3001, the smartphone 500 transmits a page request to the printer 300 in response to the operation.

In step S3002, the printer 300 having received the page request transmits the password change screen 4300 to the smartphone 500. The password change screen 4300 is thereby displayed on the screen of the smartphone 500.

In step S3003, the user 109 inputs passwords into the old password field 4301, the new password field 4302, and the new password confirmation field 4303 on the password change screen 4300, and presses the OK button 4304. In step S3004, the smartphone 500 transmits a password change request to the printer 300 in response to the operation.

In step S3005, the printer 300 having received the password change request transmits the password change confirmation screen 4400. The password change confirmation screen 4400 is thereby displayed on the screen of the smartphone 500.

In step S3006, the user 109 performs a key operation or operations on the operation panel 305 of the printer 300 according to the instructions 4401 on the operation method, displayed on the password change confirmation screen 4400. In step S3007, the user 109 further presses the OK button 4402 on the password change confirmation screen 4400 of the remote UI.

In step S3008, the printer 300 verifies the key operation(s). If the key operation(s) matches/match the predetermined user operation, then in step S3009, the printer 300 changes the password. In step S3010, the printer 300 transmits the unrestricted screen 4000 to the smartphone 500. The unrestricted screen 4000 is thereby displayed on the screen of the smartphone 500.

While the screen is described to transition to the unrestricted screen 4000 after the password change, the screen may transition to the password authentication screen 4200 after the password change so that authentication is performed again with the changed password.

In the present exemplary embodiment, in changing the password set in the printer 300 by an operation performed from the external apparatus via the remote UI, the password set in the printer 300 is changed on a condition that the predetermined user operation on the operation panel 305 is successfully confirmed.

With such a configuration, in changing the password from the external apparatus such as the smartphone 500, the confirmation operation can be performed on the main body of the printer 300 to prevent the password from being remotely changed in an unauthorized manner. This enables a secure password change upon the first use of the remote UI even if the main body of the printer 300 is not capable of receiving input of the password.

In the first exemplary embodiment, the password change confirmation screen 4400 is described to be displayed after the password change information is input on the password change screen 4300 of the remote UI. A second exemplary embodiment deals with a configuration where the password change screen 4300 and the password change confirmation screen 4400 are displayed in reverse order, i.e., the password change confirmation screen 4400 is displayed first and then the password change screen 4300 is displayed after confirmation of a predetermined user operation. Differences from the first exemplary embodiment will be described below.

Figure 12:
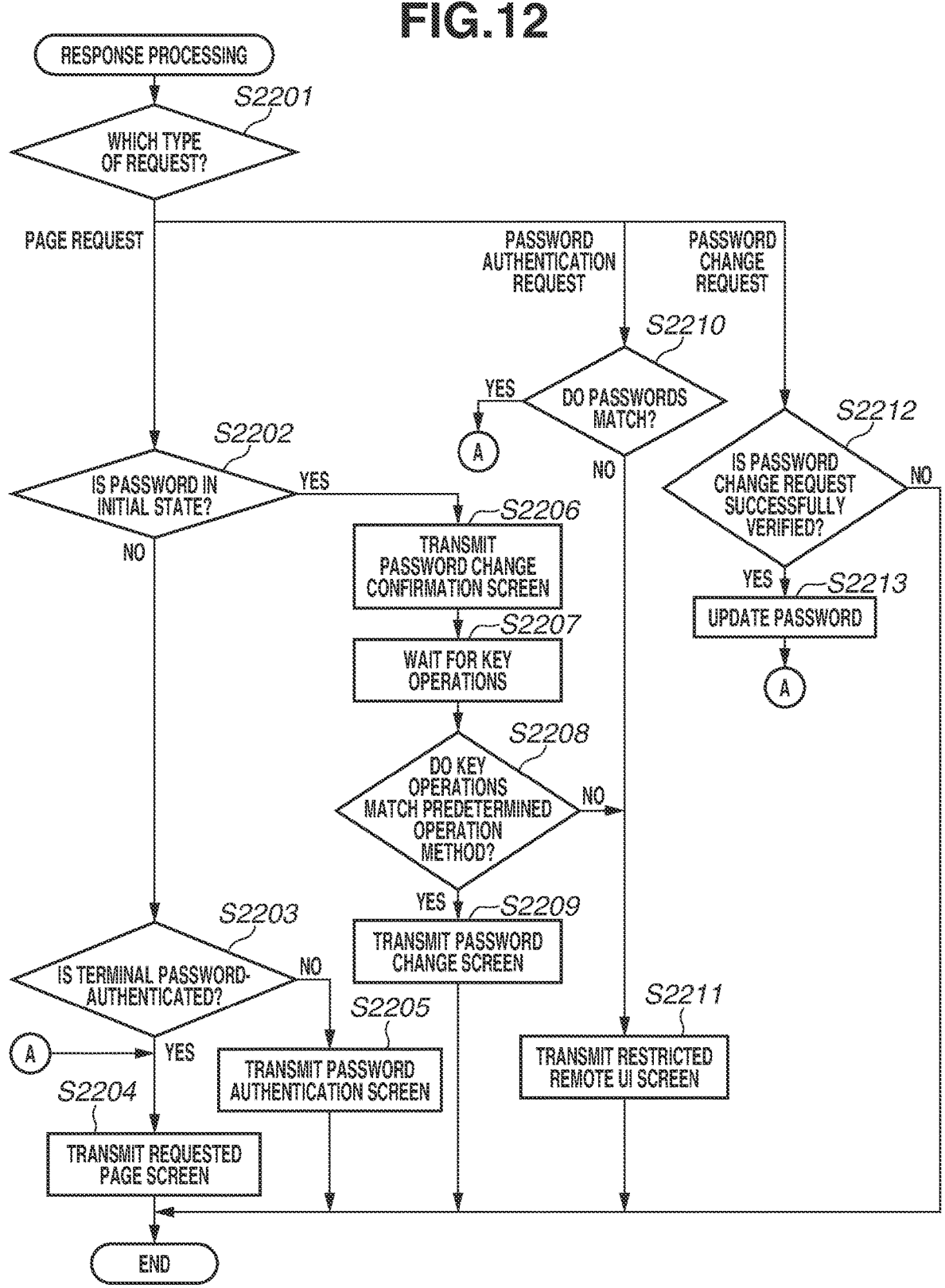
FIG. 12 is a flowchart illustrating details of processing by a printer in receiving a remote UI request according to a second exemplary embodiment.

FIG. 12 is a flowchart illustrating an example of details of processing by the printer 300 in receiving a remote UI request according to the second exemplary embodiment. The flowchart illustrates details of the response processing (step S2007) in the flowchart of FIG. 9. In other words, the processing of the flowchart is performed by the CPU 311 of the printer 300 when the occurrence of an event to issue a remote UI request from the web browser 1534 of the external apparatus (smartphone 500) to the web server module 1334 of the printer 300 is detected.

The processing of steps S2201 to S2205 is similar to that of steps S2101 to S2105 in FIG. 10. A description thereof will thus be omitted.

If, in step S2202, the password is in the initial state (YES in step S2202), the processing proceeds to step S2206. In step S2206, the CPU 311 transmits the password change confirmation screen 4400 to the requesting terminal.

In step S2207, the CPU 311 waits for a key operation or operations to be performed on the operation panel 305 of the printer 300. If a key operation or operations is/are performed, the processing proceeds to step S2208. In step S2208, the CPU 311 checks whether the key operation(s) performed matches/match the predetermined operation method displayed on the password change confirmation screen 4400. If the key operation(s) matches/match the predetermined operation method (YES in step S2208), the processing proceeds to step S2209. In step S2209, the CPU 311 transmits the password change screen 4300 to the requesting terminal.

On the other hand, if the key operation(s) performed does/do not match the predetermined operation method displayed on the password change confirmation screen 4400 (NO in step S2208), the processing proceeds to step S2211 without updating the password. In step S2211, the CPU 311 transmits the restricted remote UI screen 4100 to the requesting terminal since the password authentication is failed.

The processing of steps S2210 and S2211 is similar to that of steps S2107 and S2108 in FIG. 10. A description thereof will thus be omitted.

If, in step S2201, the request type is a password change request (PASSWORD CHANGE REQUEST in step S2201), the processing proceeds to step S2212. In step S2212, the CPU 311 verifies the content of the received password change request. If the password change request is successfully verified (YES in step S2212), the processing proceeds to step S2213. In step S2213, the CPU 311 accepts the password change and updates the password. The processing proceeds to step S2204 since the requesting terminal is password-authenticated. In step S2204, the CPU 311 transmits the requested page screen to the requesting terminal. If the received password change request is erroneous and the number of occurrences of such errors is less than a predetermined number, the processing proceeds to step S2209. If the number of occurrences is greater than or equal to the predetermined number, the processing proceeds to step S2211 or ends, for example.

FIG. 13 is a sequence diagram illustrating an example of information exchange between the printer 300 and the smartphone 500 according to the second exemplary embodiment. The diagram is a sequence diagram for the case where the password of the printer 300 is in the initial state and the user 109 accesses the remote UI using the smartphone 500.

In step S3100, the user 109 accesses the remote UI by operating the smartphone 500. In step S3101, the smartphone 500 transmits a page request to the printer 300 in response to the operation.

In step S3102, the printer 300 having received the page request transmits the password change confirmation screen 4400 to the smartphone 500. The password change confirmation screen 4400 is thereby displayed on the screen of the smartphone 500.

In step S3103, the user 109 performs a key operation or operations on the operation panel 305 of the printer 300 according to the instructions 4401 on the operation method, displayed on the password change confirmation screen 4400. In step S3104, the user 109 further presses the OK button 4402 on the password change confirmation screen 4400 of the remote UI.

In step S3105, the printer 300 verifies the key operation(s). If the key operation(s) matches/match the predetermined user operation, then in step S3106, the printer 300 transmits the password change screen 4300 to the smartphone 500. The password change screen 4300 is thereby displayed on the screen of the smartphone 500.

In step S3107, the user 109 inputs passwords into the old password field 4301, the new password field 4302, and the new password confirmation field 4303 on the password change screen 4300, and presses the OK button 4304. In step S3108, the smartphone 500 transmits a password change request to the printer 300 in response to the operation.

In step S3109, the printer 300 having received the password change request changes the password. In step S3110, the printer 300 transmits the unrestricted screen 4000 to the smartphone 500. The unrestricted screen 4000 is thereby displayed on the screen of the smartphone 500.

Such a configuration enables a preliminary confirmation operation in changing the password from an external apparatus such as the smartphone 500, and can prevent an unauthorized remote password change. As in the first exemplary embodiment, this enables a secure password change upon the first use of the remote UI even if the apparatus main body is not capable of accepting input of the password.

The password change confirmation screen 4400 may be configured to be automatically terminated when a specific time has elapsed after display. In such a case, the password may be updated only if the predetermined user operation is performed on the operation panel 305 while the password change confirmation screen 4400 is displayed. In other words, if the predetermined user operation is not performed on the operation panel 305 while the password change confirmation screen 4400 is displayed (i.e., within the specific time), the password is not updated because of time-out.

The foregoing exemplary embodiments may be carried out with the following modifications in configuration.

In the foregoing exemplary embodiments, the password change confirmation screen 4400 is described to be displayed in changing the password in the initial state. However, the password change confirmation screen 4400 may be configured to be displayed each time the password is changed from the remote UI screen. For example, if a password change page is requested as a "page request", the CPU 311 transmits the password change screen 4300 to the requesting terminal as the requested page screen after the password authentication. Specifically, the CPU 311 transmits the password change screen 4300 as the requested page screen in step S2104 of the first exemplary embodiment and step S2204 of the second exemplary embodiment.

A password change may be requested not only in the initial state but regularly even after the password is changed. In other words, a password change may be requested if the password is not changed for a specific period.

A random character string may be set as the password in the initial state. The password in the initial state does not necessarily need to be set. If a random character string is set, a password change is permitted based on two factors that the user knows the random initial password and that the predetermined user operation is successfully performed on the operation panel 305 of the printer 300. This enables operation with two-factor authentication.

Moreover, if a plurality of users performs authentication using respective different accounts, an exemplary embodiment can be applied to each of the accounts.

The present disclosure is not limited to image forming apparatuses such as a printer, and can be applied to various other information processing apparatuses including network-connectable smart home appliances, cameras, and navigation systems.

According to the foregoing exemplary embodiments, an apparatus including the apparatus main body that does not include an operation panel capable of password setting and is not capable of accepting input of a password can perform a secure password change.

It will be understood that the configurations and content of the foregoing various types of data are not restrictive, and various configurations and content may be employed depending on the applications and use purposes.

While some exemplary embodiments have been described above, exemplary embodiments of the present disclosure can be implemented as a system, an apparatus, a method, a program, and/or a storage medium, for example. Specifically, an exemplary embodiment of the present disclosure may be applied to a system including a plurality of devices, or an apparatus including a single device.

All combinations of the foregoing exemplary embodiments are also included in the present disclosure.

An exemplary embodiment of the present disclosure can also be implemented by processing for supplying a program for implementing one or more functions of the foregoing exemplary embodiments to a system or an apparatus via a network or a storage medium, and reading and executing the program by one or more processors in a computer of the system or apparatus. A circuit for implementing one or more functions (such as an application specific integrated circuit (ASIC)) can also be used for implementation.

An exemplary embodiment of the present disclosure may be applied to a system including a plurality of devices, or an apparatus including a single device.

The present disclosure is not limited to the foregoing exemplary embodiments. Various modifications (including organic combinations of the exemplary embodiments) can be made based on the gist of the present disclosure, and such modifications are not excluded from the scope of the present disclosure. In other words, configurations obtained by combining the foregoing exemplary embodiments and modifications thereof are also included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-093325, which was filed on Jun. 8, 2022 and which is hereby incorporated by reference herein in its entirety.

What is claimed is:

1. An information processing apparatus comprising:
an operation section including at least one operation unit that is different from a display unit configured to display information about the information processing apparatus;
a communication unit configured to communicate with an external apparatus, the information processing apparatus having a function of a remote user interface (UI) configured to receive an operation from the external apparatus via the communication unit;
one or more computer-readable storage media; and
one or more processors,
wherein the one or more processors and the one or more computer-readable storage media are configured to:
if an operation to change a password that is set in the information processing apparatus is performed from the external apparatus via the remote UI and a predetermined operation to change the password is performed on the operation section of the information processing apparatus, change the password that is set in the information processing apparatus to a password based on the operation performed from the external apparatus via the remote UI.

2. The information processing apparatus according to claim 1, wherein the predetermined operation to change the password is an operation on a specific operation unit included in the operation section or a combination of operations on a plurality of specific operation units.

3. The information processing apparatus according to claim 2, wherein the one or more processors and the one or more computer-readable storage media are further configured to, if the operation performed from the external apparatus via the remote UI is received, notify the external apparatus of information indicating a procedure for the predetermined operation to change the password.

4. The information processing apparatus according to claim 3, wherein the one or more processors and the one or more computer-readable storage media are further configured to change content of the predetermined operation each time the operation performed from the external apparatus via the remote UI is received.

5. The information processing apparatus according to claim 3, wherein the one or more processors and the one or more computer-readable storage media are further configured to transmit a screen configured to provide an instruction on the predetermined operation to change the password to the external apparatus as the information indicating the procedure for the predetermined operation to change the password.

6. The information processing apparatus according to claim 5, wherein the screen configured to provide the instruction on the predetermined operation to change the password is a screen configured to be automatically hidden after a lapse of a specific time.

7. The information processing apparatus according to claim 6, wherein the one or more processors and the one or more computer-readable storage media are further configured to, if the predetermined operation to change the password is not performed on the operation section before the lapse of the specific time, not change the password that is set in the information processing apparatus.

8. The information processing apparatus according to claim 1, wherein the one or more processors and the one or more computer-readable storage media are further configured to, if a use request for the remote UI is received from the external apparatus, request the external apparatus to change the password that is set in the information processing apparatus from the external apparatus based on a fact that the password that is set in the information processing apparatus is in an initial state.

9. The information processing apparatus according to claim 8, wherein the one or more processors and the one or more computer-readable storage media are further configured to, if the password that is set in the information processing apparatus is not changed, restrict the use of the remote UI.

10. The information processing apparatus according to claim 9, wherein the one or more processors and the one or more computer-readable storage media are further configured to, if the password that is set in the information processing apparatus is not changed for a specific period, request the external apparatus to change the password that is set in the information processing apparatus.

11. The information processing apparatus according to claim 1, wherein the information processing apparatus is a printing apparatus.

12. The information processing apparatus according to claim 1, wherein the one or more processors and the one or more computer-readable storage media are further configured to restrict use of the remote UI from the external apparatus until authentication using the password that is set in the information processing apparatus is performed from the external apparatus.

13. The information processing apparatus according to claim 1,
wherein if the operation to change the password that is set in the information processing apparatus is performed from the external apparatus via the remote UI and information about the predetermined operation to change the password to be performed in the information processing apparatus is displayed on a display unit of the external apparatus, the password that is set in the information processing apparatus is changed to a password based on the operation performed from the external apparatus via the remote UI upon the predetermined operation being performed on the operation section of the information processing apparatus, and
wherein the operation section is at least one of a key for selecting a sheet of paper to be used in a printing function of the information processing apparatus, a key for determining information selected in the information processing apparatus, a key for starting a printing operation of the printing function, or a key for cancelling processing being executed in the information processing apparatus.

14. A control method of an information processing apparatus including an operation section including at least one operation unit that is different from a display unit configured to display information about the information processing apparatus, and a communication unit configured to communicate with an external apparatus, the information processing apparatus having a function of a remote UI configured to receive an operation from the external apparatus via the communication unit, the control method comprising:
if an operation to change a password that is set in the information processing apparatus is performed from the external apparatus via the remote UI and a predetermined operation to change the password is performed on the operation section of the information forming apparatus, changing the password that is set in the information processing apparatus to a password based on the operation performed from the external apparatus via the remote UI.

15. One or more non-transitory computer-readable media storing instructions that, when executed by one or more computing devices, cause the one or more computing devices to perform operations that comprise:
if an operation to change a password that is set in an information processing apparatus, the information processing apparatus having a function of a remote user interface (UI) configured to receive an operation from an external apparatus, is performed from the external apparatus via the remote UI and a predetermined operation to change the password is performed on an operation section of the information forming apparatus, the operation section including at least one operation unit that is different from a display unit configured to display information about the information processing apparatus, changing the password that is set in the information processing apparatus to a password based on the operation performed from the external apparatus via the remote UI.

* * * * *